United States Patent

Naritomi

[11] Patent Number: 5,520,971
[45] Date of Patent: May 28, 1996

[54] AIR BAG COVER AND METHOD OF PRODUCING THE SAME

[75] Inventor: Masanori Naritomi, Urayasu, Japan

[73] Assignees: Izumi Motor Co., Ltd.; Taisei Plas Co., Ltd., both of Japan

[21] Appl. No.: 312,443

[22] Filed: Sep. 26, 1994

Related U.S. Application Data

[63] Continuation of Ser. No. 892,542, May 29, 1992, abandoned.

[30] Foreign Application Priority Data

Jun. 3, 1991 [JP] Japan .................................... 3-157473
Nov. 19, 1991 [JP] Japan .................................... 3-330157

[51] Int. Cl.⁶ .................................................. B60R 21/16
[52] U.S. Cl. ...................... 428/35.2; 428/35.5; 428/35.7; 428/43; 428/76; 428/99; 428/136; 280/728.1; 280/728.2
[58] Field of Search ................... 428/35.7, 36.6, 428/36.92, 43, 99, 131, 136, 138, 76; 280/728.1, 730.1, 729, 743.1, 728.2

[56] References Cited

U.S. PATENT DOCUMENTS

| | | | |
|---|---|---|---|
| 3,819,205 | 6/1974 | Dunford et al. | 280/731 |
| 4,995,638 | 2/1991 | Shinto et al. | 280/731 |
| 5,002,625 | 3/1991 | Naritomi et al. | 156/245 |
| 5,013,064 | 5/1991 | Miller et al. | 280/730.1 |
| 5,110,647 | 5/1992 | Sawada et al. | 280/728.3 |
| 5,149,127 | 9/1992 | Manabe et al. | 280/743.1 |
| 5,149,589 | 9/1992 | Naritomi et al. | 428/412 |
| 5,152,548 | 10/1992 | Zushi | 280/731 |

FOREIGN PATENT DOCUMENTS 0486708   5/1992   European Pat. Off. .

Primary Examiner—Ellis P. Robinson
Assistant Examiner—Rena L. Dye
Attorney, Agent, or Firm—Bierman and Muserlian

[57] ABSTRACT

An air bag cover having an opening portion that has a tear line at which the opening portion is torn by a predetermined pressure, and a mounting portion that has a mounting hole for insertion of a fastener for attaching the cover to another member. The opening portion is made of a thermoplastic elastomer, while the mounting portion is made of a rigid thermoplastic synthetic resin material. The opening portion and the mounting portion are integrally welded together under high pressure. The air bag cover is produced by a method comprising the first step of injecting the thermoplastic elastomer through a first gate into a first cavity for forming the opening portion, and the second step of injecting the thermoplastic synthetic resin material through a second gate into a second cavity communicated with the first cavity for forming the mounting portion. In the first step, the opening portion is formed with the second cavity closed. In the second step, the mounting hole of the mounting portion is formed with a movable pin inserted into the second cavity. The second step may be carried out either after or simultaneously with the first step.

1 Claim, 6 Drawing Sheets

AIR BAG COVER AND METHOD OF PRODUCING THE SAME

This application is a continuation of application Ser. No. 07/892,542, filed May 29, 1992, now abandoned.

BACKGROUND OF THE INVENTION

1. Field of the Invention

The present invention relates to a cover for an air bag used in an automobile and also to a method of producing the air bag cover. More specifically, when an automobile comes into collision, the occupant of the car is flung forwardly by the impact of the collision. As a result, an air bag that is installed in front of the seat is inflated instantaneously with a high-pressure gas. Thus, the inflated air bag serves as a cushion to protect the occupant from dangers of the collision. Such a device is generally known as "air bag safety device".

Thus, the present invention relates to a cover for an air bag used in the air bag safety device and also to a method of producing such an air bag cover.

2. Description of the Prior Art

Recently, an increasing number of air bag safety devices have been used in automobiles in order to reduce the rate of death from traffic accidents. There is a growing tendency to enact legislation for the use of an air bag safety device, and the percentage of automobiles equipped with an air bag safety device has been increasing more and more.

To make sure, a typical air bag safety device will be explained below. The air bag safety device is designed to protect the human body or the like from an impact of collision, and it is provided with an air bag for this purpose. The air bag is orderly folded up in an air bag cover that is attached to the air bag safety device.

The air bag cover has a tear line formed at a proper position thereof so that the air bag cover is readily broken at the tear line by a predetermined internal pressure. If the vehicle collides against something, gas generant is ignited through a certain sensor to inflate the air bag. As the air bag inflates, the tear line is stressed, resulting in the air bag cover being torn at the tear line. Then, the cover opens, and the air bag springs out through the opening of the cover.

The air bag thus sprung out receives the occupant's body to protect him or her from an impact of the collision. Since this chain of operations takes place almost instantaneously, when it is torn at the tear line, the air bag cover is likely to burst into fine fragments. In general, the fine fragments burst out at an extremely high speed. There is therefore a danger that such fine fragments may stick in the occupant's body. For this reason, there has been a demand for an air bag cover designed so that it is prevented as much as possible from bursting into fine fragments when torn at the tear line.

In the meantime, the air bag cover is secured to the body of the air bag safety device by using fasteners, for example, rivets, screws, bolts, etc. When the air bag inflates on collision of the vehicle, the air bag cover accommodating the air bag is torn by the pressure of the inflating air bag, and the air bag springs out to project. At this time, an extraordinarily large force acts on that portion of the air bag cover which is secured to the body of the air bag safety device.

Accordingly, the mounting portion of the air bag cover that is secured to the body of the air bag safety device must have sufficiently high mechanical strength. It is undesirable for the mounting portion to break when the opening portion of the cover is torn, as a matter of course. Under these circumstances, an air bag cover having an integral two-layer structure comprising a soft surface (skin) layer and a rigid core layer has been proposed (see, for example, Japanese Patent Application Laid-Open (KOKAI) 1-202550). The prior art disclosed in this publication has an advantage in that when the air bag cover opens, the core layer is prevented from bursting into fragments by the soft surface layer.

However, the two-layer type air bag cover needs to first form a core layer and then inject a skin layer wide over the whole surface of the core layer to thereby unite them together. It is therefore necessary to prepare separately a first mold cavity for forming the core layer and a second mold cavity for forming the skin layer.

The core layer formed in the first mold cavity is moved to the second mold cavity, and then the skin layer is injected over the whole surface of the core layer. Otherwise, it is necessary to use a split mold and execute a molding process such that the mold is moved after a core layer material has been injected into a cavity for forming a core layer and then a cavity for forming a skin layer is newly prepared and a skin layer material is injected into the cavity. In this case, the injection molded air bag cover is difficult to remove from the mold because of a complicated configuration including undercuts, and an extremely complicated mold structure is needed to cope with such a configuration with undercuts.

In addition, since in the air bag cover having the two-layer structure the area of contact between the core layer and the skin layer is wide, no adequate adhesion is obtained between the core and skin layers with the above-described method, so that the molded product is inferior in the peel strength between the core and skin layers.

With the above-described technical background, the present invention aims at attaining the following objects:

It is an object of the present invention to provide an air bag cover which needs no complicated mold because an opening portion thereof, through which the air bag springs out, has no two-layer structure, and also provide a molding method for producing the air bag cover.

It is another object of the present invention to provide an air bag cover which is designed so that the constituent material is unlikely to scatter when the air bag cover opens, and also provide a molding method for producing the air bag cover.

It is still another object of the present invention to provide an air bag cover wherein a mounting portion thereof, which is secured to the body of an air bag safety device, has sufficiently high mechanical strength, and also provide a molding method for producing the air bag cover.

SUMMARY OF THE INVENTION

The present invention provides an air bag cover enclosing an air bag, comprising an upper portion made of a single layer of a thermoplastic synthetic resin elastomer and having a tear line at which the upper portion is torn by a predetermined level of stress applied by inflation of the air bag, a mounting portion made of a rigid thermoplastic synthetic resin material and having a mounting hole for insertion of a fastener for attaching the cover to another member, and a weld where the upper portion and the mounting portion are integrally welded together under high pressure.

The air bag cover may be produced by a method comprising the first step of injecting the thermoplastic synthetic resin elastomer through a first gate into a first cavity defined in an injection mold for molding the upper portion, and the second step of injecting, after completion of the first step, the rigid thermoplastic synthetic resin material through a second gate into a second cavity that is defined in the injection mold in communication with the first cavity for molding the mounting portion.

DESCRIPTION OF THE PREFERRED EMBODIMENTS

Figure 1:
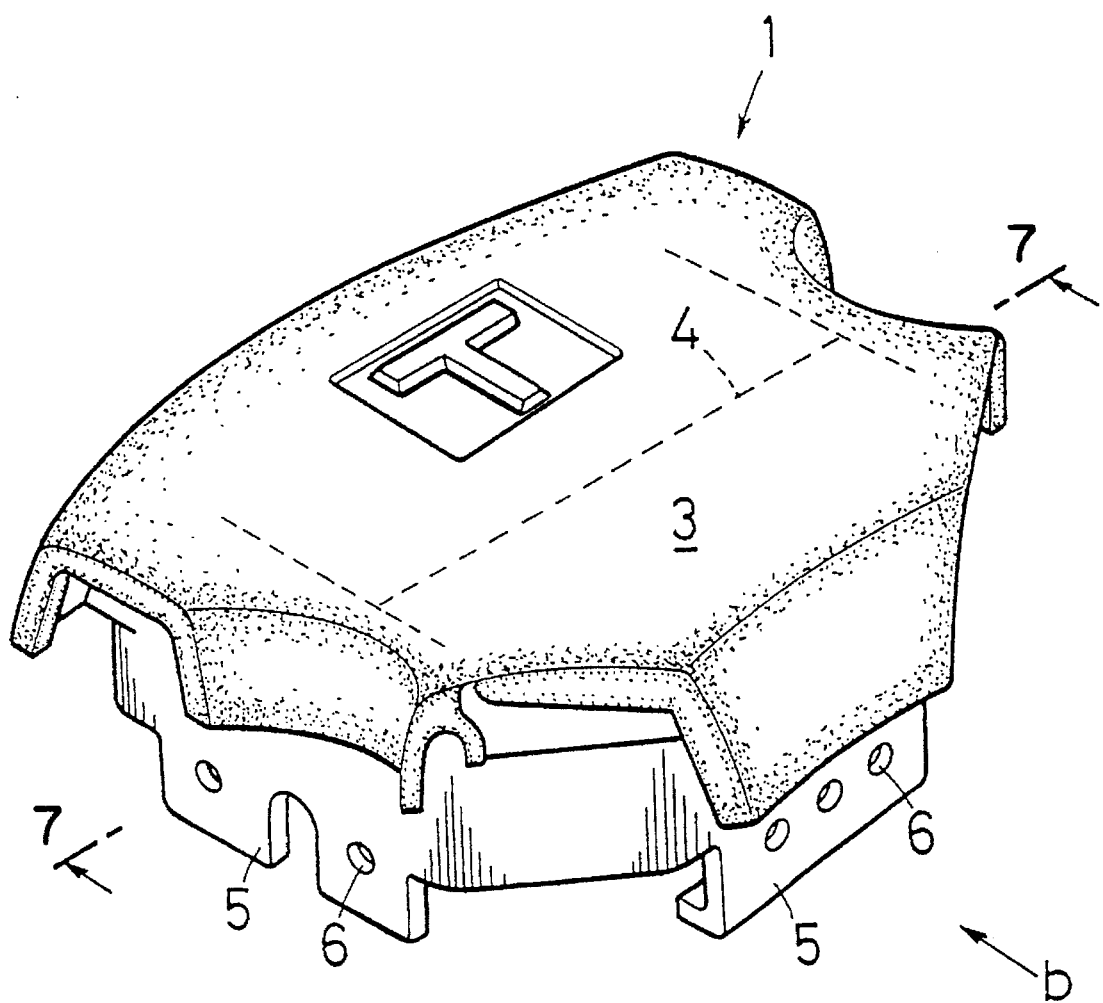
FIG. 1 is a perspective view showing the external appearance of one embodiment of the air bag cover according to the present invention.
Figure 2:
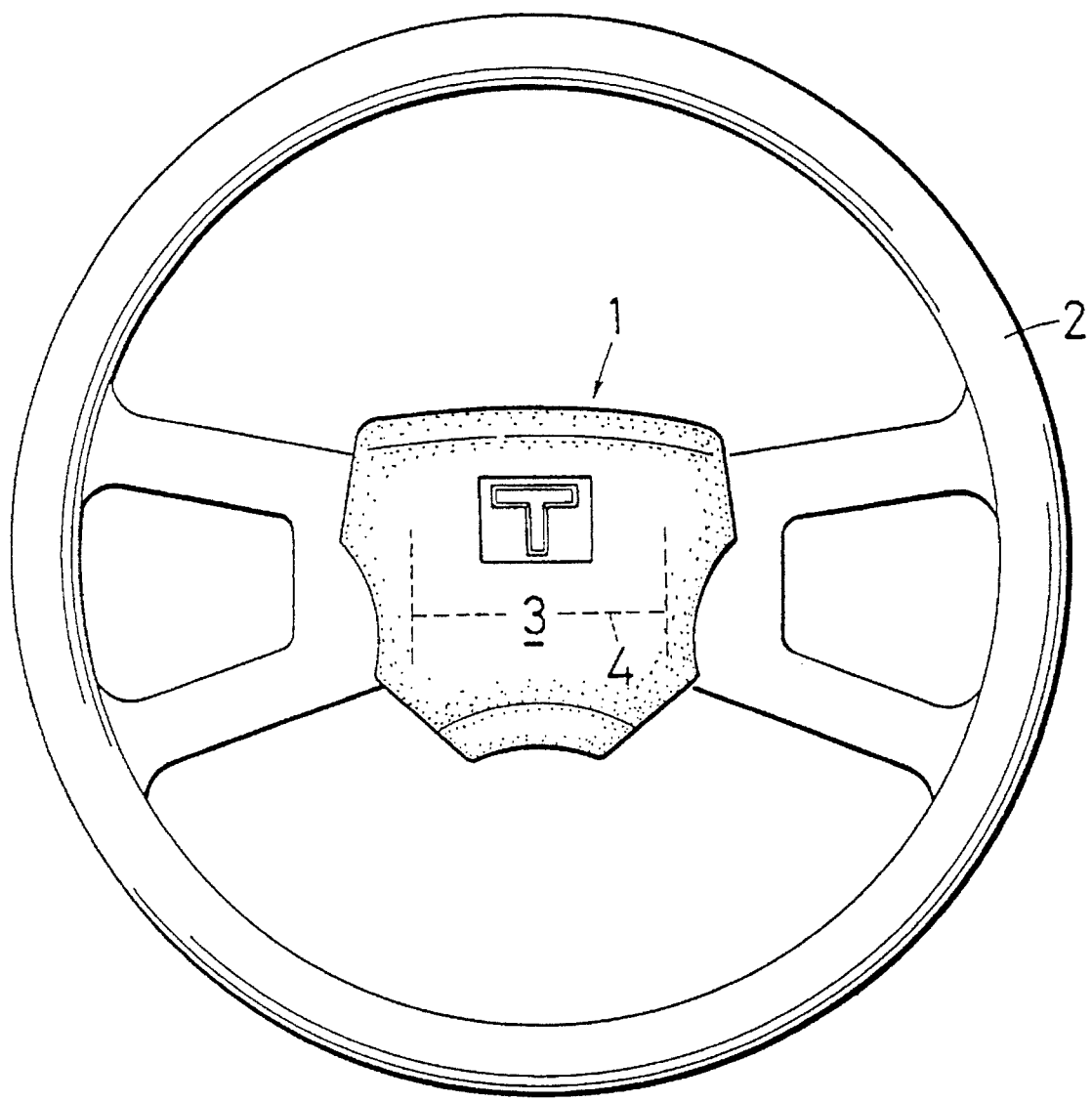
FIG. 2 shows the air bag cover which is attached to a steering wheel.

Embodiments of the present invention will be described below with reference to the accompanying drawings. FIG. 1 is a perspective view showing the external appearance of one embodiment of the air bag cover according to the present invention. FIG. 2 shows the air bag cover which is attached to a steering wheel. The air bag cover 1 has a box-shaped configuration as a whole. The air bag cover 1 encloses an air bag (not shown), which is folded up therein. The upper portion of the air bag cover 1 is herein referred to as "opening portion 3". The opening portion 3 is provided with a tear line 4 in the shape of an H. The tear line 4 is arranged to open when a certain stress limit is reached. Various shapes may properly be adopted for the tear line 4. As will be understood from its name, the opening portion 3 opens when it tears at the tear line 4.

In general, the opening portion 3 is always in contact with the occupant's hand, or skin. Therefore, it is made of a thermoplastic synthetic resin elastomer which is soft to the touch. If the vehicle collides against something, the collision is detected with a sensor, and gas generant is ignited in response to the detection signal from the sensor, thereby inflating the air bag. The inflating air bag applies an internal pressure to the air bag cover 1, causing the tear line 4 in the air bag cover 1 to open in the shape of an H. As a result, the air bag springs out to project through the torn opening portion 3.

At this time, there is normally no likelihood that fragments of the torn opening portion 3 of the air bag cover 1 will scatter. This is because the opening portion 3 is made of a thermoplastic elastomer, which is a relatively soft material. A plate-shaped mounting portion 5 is provided underneath the opening portion 3 of the air bag cover 1 as an integral part of the opening portion 3 which extends substantially perpendicularly thereto in the shape of a rectangular cylinder.

The mounting portion 5 has a plurality of mounting holes 6 formed at proper positions. Originally, the air bag cover 1 needs to be attached to an air bag device or a vehicle body.

Therefore, the air bag cover 1 is attached to an air bag device or a vehicle body by using fasteners, e.g., rivets, screws, bolts, etc., through the mounting holes 6.

Accordingly, tensile stress acts between the mounting portion 5 and the rivets, screws, bolts, etc, and the mounting portion 5 is therefore required to be sufficiently high in terms of mechanical strength. For this reason, a material for the mounting portion 5 is generally selected from among thermoplastic synthetic resin materials which are relatively rigid and have high mechanical strength. A rigid thermoplastic synthetic resin material used as a material for the mounting portion 3 and a thermoplastic elastomer as a material for the opening portion 3 are firmly welded, that is, the two materials which are molten are bonded together under pressure, thereby forming an integral structure.

The following is a description of one example of mold equipment for producing the air bag cover 1 of the present invention.

Injection mold 10 (first embodiment)

Figure 3:
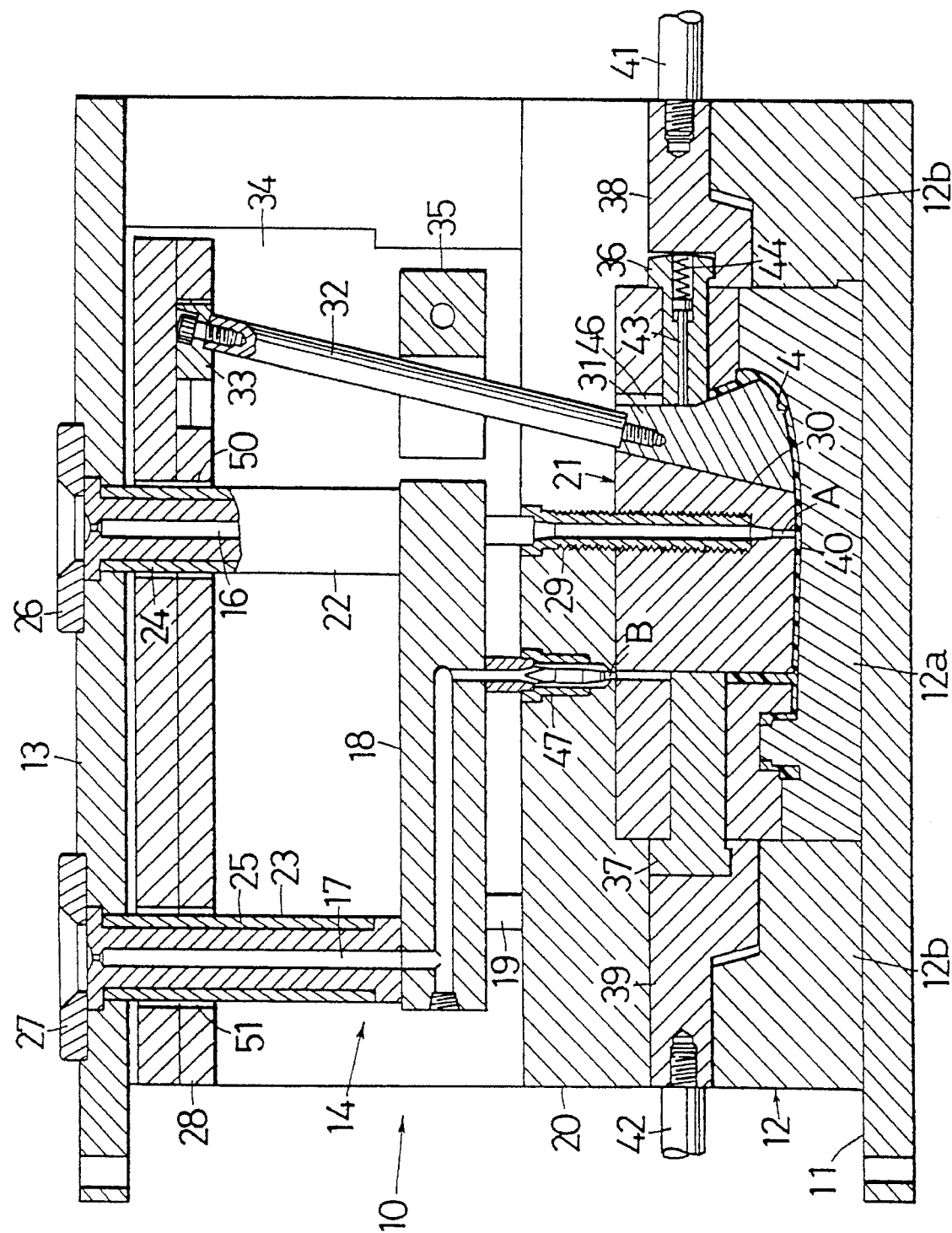
FIG. 3 is a sectional view of an injection mold at the time of molding an opening portion of the air bag cover.
Figure 4:
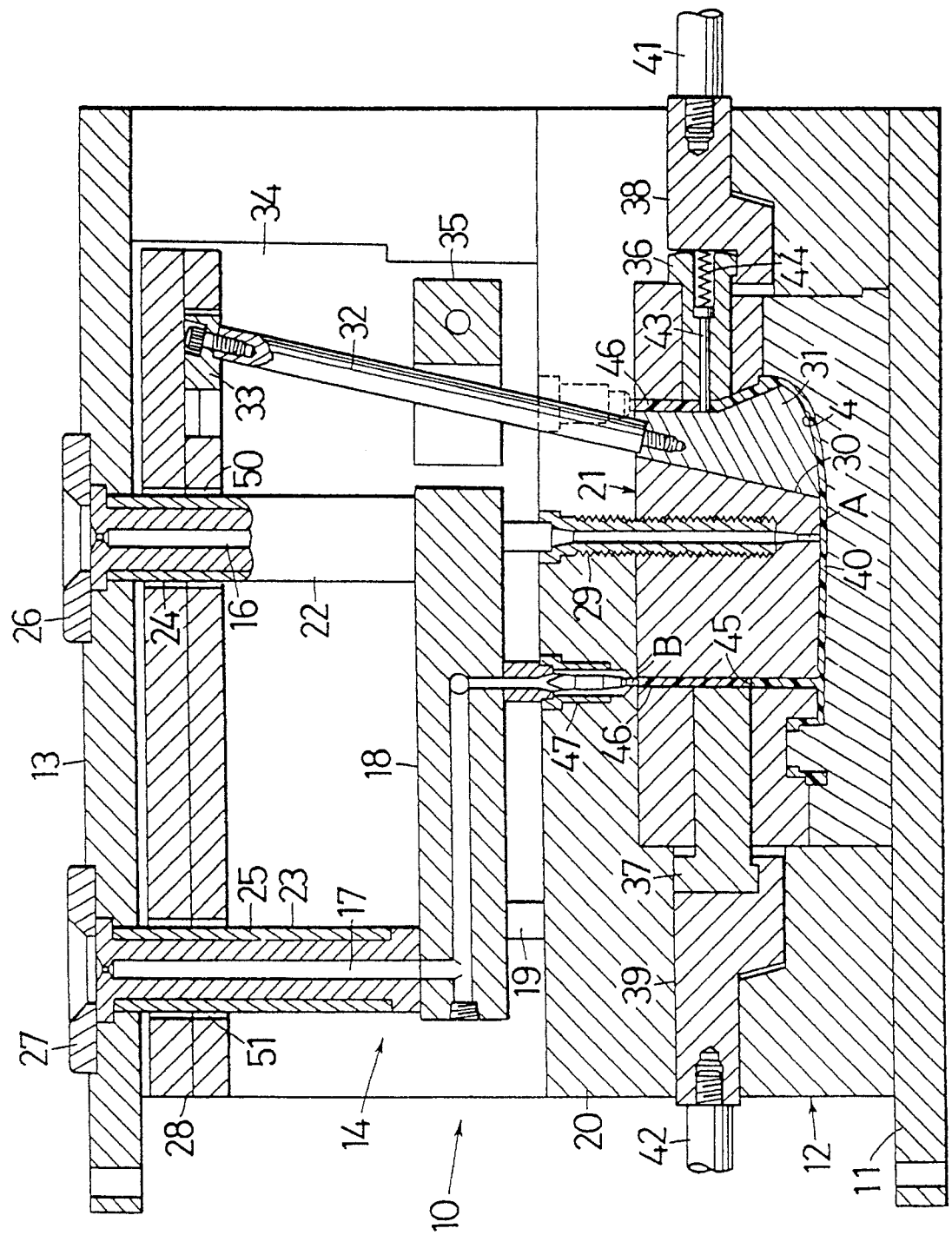
FIG. 4 is a sectional view of the injection mold at the time of molding a mounting portion of the air bag cover.

An injection mold 10 for producing the above-described air bag cover 1 will be explained. FIG. 3 is a sectional view of the injection mold 10 at the time of molding the opening portion 3 of the air bag cover 1. FIG. 4 is a sectional view of the injection mold 10 at the time of molding the mounting portion 5. In this embodiment, a hot-runner mold is employed as the injection mold 10.

The injection mold 10 comprises a fixed retainer plate 12 provided on a fixed mounting plate 11 and a movable retainer plate 14 provided on a movable mounting plate 13. The fixed retainer plate 12 comprises a central retainer plate 12a that is formed with a cavity 15 (see FIG. 5) and a side retainer plate 12b that is disposed around the central retainer plate 12a. The movable mounting plate 13 is provided on a movable platen 34 as an integral part of the latter.

The movable retainer plate 14 has a hot-runner block, i.e., manifold 18, which has first and second hot runners 16 and 17 formed therein. The manifold 18 is connected with a retainer plate body 20 through a support member 19, and a main core 21 is secured to the retainer plate body 20.

The manifold 18 has guide rods 22 and 23 which are provided to correspond to the first and second hot runners 16 and 17, respectively, the distal ends of the guide rods 22 and 23 being secured to the movable mounting plate 13. Band heaters 24 and 25 are used to heat resin materials flowing through the hot runners 16 and 17.

The respective portions of the guide rods 22 and 23 which are secured to the movable mounting plate 13 are provided with sprue bushes 26 and 27 for receiving a nozzle of an injection molding machine (not shown). The guide rods 22 and 23 extend through respective guide holes 50 and 51 provided in a fixed guide plate 28. The movable retainer plate 14 is guided by the guide plate 28 to move between a mold clamping position (i.e., the position shown in FIGS. 3 and 4) where the movable retainer plate 14 is in contact with the fixed retainer plate 12 and a mold opening position (i.e., the position shown in FIG. 5) where the movable retainer plate 14 is separate from the fixed retainer plate 12.

The retainer plate body 20 is provided with nozzles 29 and 47 which are communicated with the first and second hot runners 16 and 17, respectively. The main core 21 has a tapered face formed on the side surface thereof, and an auxiliary core 31 is provided in such a manner as to be engageable with the tapered face 30. The main and auxiliary cores 21 and 31 define a first cavity portion 40 when the mold is clamped. The inlet of the first cavity portion 40 is formed as a gate A at the extension of the nozzle 29.

The auxiliary core 31 has one end of a connecting rod 32 secured thereto, the rod 32 being inclined at the same angle as that of the inclination of the tapered face 30. The other end of the connecting rod 32 is secured to a slider 33 provided on the guide plate 28, the slider 33 being slidable relative to the guide plate 28 in a direction perpendicular to the direction of movement of the movable retainer plate 14. In addition, the intermediate portion of the connecting rod 32 is engageable with an engagement member 35 that is provided on the movable platen 34.

Figure 5:
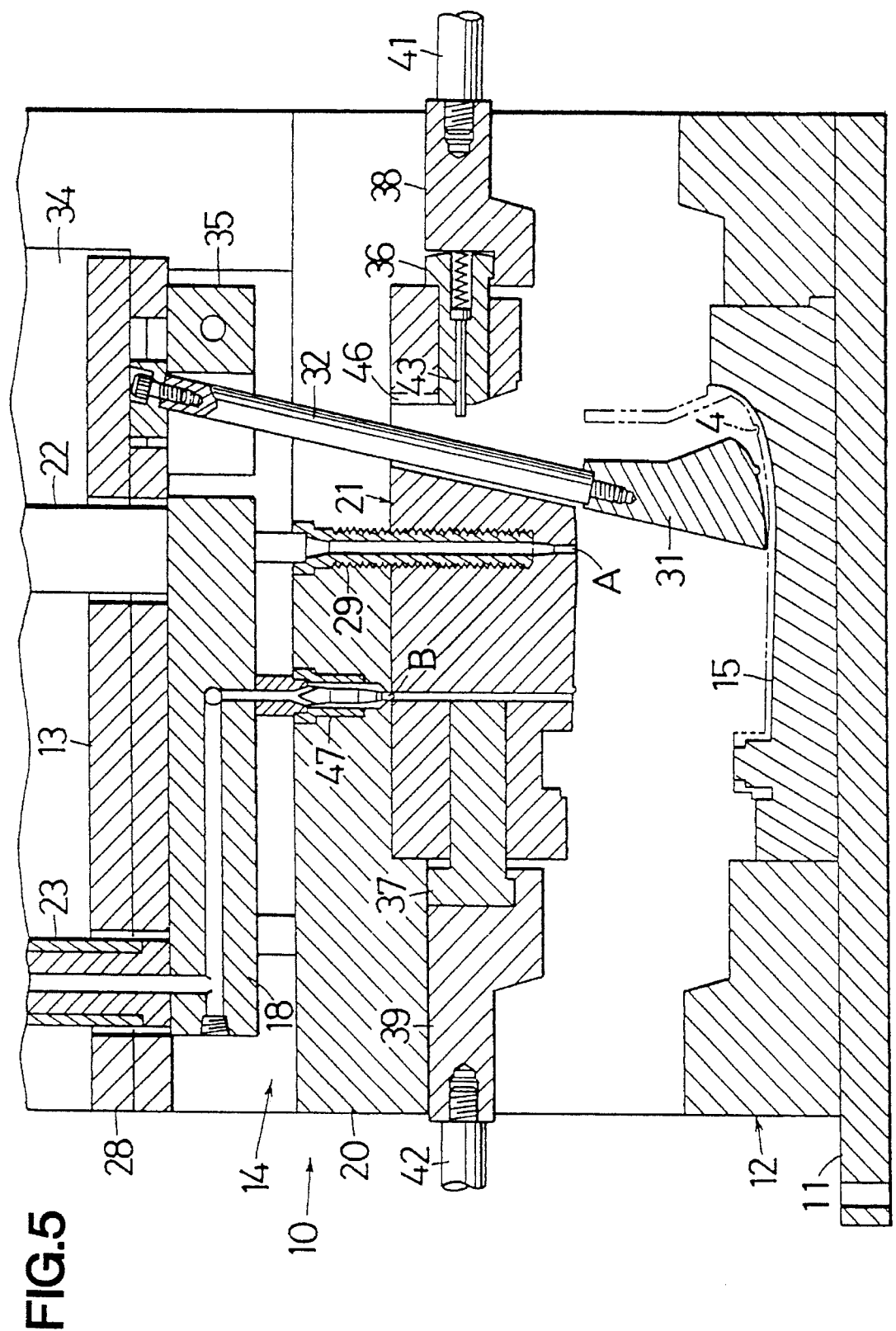
FIG. 5 is a sectional view of the injection mold which is open.

Accordingly, when the movable retainer plate 14 moves from the mold clamping position, shown in FIGS. 3 and 4, to the mold opening position, shown in FIG. 5, the main core 21 disengages from the auxiliary core 31. In the meantime, the connecting rod 32 is pushed by the engagement member 35, causing the slider 33 to slide. As a result, the auxiliary core 31 moves within the cavity 15 toward the center thereof. Conversely, when the movable retainer plate 14 moves from the mold opening position to the mold clamping position, the main core 21 engages with the auxiliary core 31, so that the auxiliary core 31 is pushed to move within the cavity 15 away from the center.

Slide cores 36 and 37 are provided around the main core 21 in such a manner as to be slidable relative to the main core 21 in respective directions perpendicular to the direction of movement of the movable retainer plate 14. Engagement members 38 and 39 are engaged with the respective rear ends of the slide cores 36 and 37. The engagement members 38 and 39 are connected to respective rods 41 and 42 of driving cylinders (not shown).

The slide cores 36 and 37 are driven by the driving cylinders to move between a position (shown in FIG. 3) where the slide cores 36 and 37 lie closer to the main core 21 and a position (shown in FIG. 4) where the cores 36 and 37 lie apart from the main core 21 to define a second cavity portion 46. The inlet of the second cavity 46 is formed as a gate B at the extension of the nozzle 47. A pin 43 is provided inside the slide core 36. The pin 43 is constantly biased by a spring 44 in a direction in which the pin 43 projects toward the main core 21. The pin 43 is used to form a mounting hole 6 in the mounting portion 5.

The following is a description of a method of producing the air bag cover 1 by use of the injection mold 10.
Production method 1

When the movable retainer plate 14 which is in the mold opening position, shown in FIG. 5, is moved toward the fixed retainer plate 12 to reach the mold clamping position, shown in FIG. 3, the first cavity portion 40 is formed. The nozzle of an injection molding machine (not shown) is brought into contact with the sprue bush 26, and a molten thermoplastic elastomer is injected into the first cavity portion 40 through the first hot runner 16, the nozzle 29 and the gate A to form an opening portion 3 (this process being referred to as "first step"). At this time, the slide cores 36 and 37 are at respective positions closer to the main core 21, so that no second cavity portion is defined (formed).

Next, before the thermoplastic elastomer constituting the opening portion 3 cools down, the slide cores 36 and 37 are moved by the operation of the driving cylinders to respective positions apart from the main core 21 to define the second cavity portion 46, as shown in FIG. 4. Then, the nozzle of an injection molding machine (not shown) is brought into contact with the sprue bush 27, and a molten thermoplastic synthetic resin material is injected into the second cavity portion 46 through the second hot runner 17, the nozzle 47 and the gate B to form a mounting portion 5 (this process being referred to as "second step").

At this time, the thermoplastic elastomer constituting the opening portion 3 and the thermoplastic synthetic resin material constituting the mounting portion 5 bond together under high pressure. In other words, both materials are mixed and fused together under high pressure at a meeting position with a small area of contact to form a complicated joint area 45. This is a noteworthy point in the present invention. That is, unlike the conventional air bag cover having a two-layer structure, the air bag cover of the present invention has a small area of contact between the two different kinds of resin material, as described above. Accordingly, the resin material that is injected under pressure is concentrated on the joint area 45, thus enabling both the resin materials to be welded together under high pressure. Accordingly, the joint area 45 provides high tensile strength, and it is possible to obtain a product of high reliability.

When the mounting portion 5 is to be molded, the pin 43 projects into the second cavity portion 46, so that no resin material fills the portion that is occupied by the pin 43, resulting in a mounting hole 6. Finally, the movable retainer plate 14 is moved to open the mold, as shown in FIG. 5. At this time, the auxiliary core 31 moves toward the center of the cavity 15; therefore, even if the opening portion 3 has inwardly bent end portions, that is, undercuts, the removal of the molded product can be effected easily. It should be noted that the tear line 4 in the air bag cover 1 is formed by a projection that is provided in the first cavity portion 40.

The above-described embodiment adopts a method wherein resin materials are injected by amounts which are equal to the respective volumes of the first and second cavities 40 and 46 of the injection mold 10, that is, the respective volumes of the opening and mounting portions 4 and 5. However, the molding process may be such that a thermoplastic elastomer for constituting the opening portion 4 is first injected by an amount equal to the total volume of the first and second cavities 40 and 46, that is, the overall volume of the air bag cover 1, and thereafter a thermoplastic synthetic resin material is injected by an amount equal to the volume of the mounting portion 5, that is, about 10% of the overall volume. This molding process enables a denser molded product to be obtained. However, the required molding cannot be realized by the process reverse to the above. The reason why a denser molded product can be obtained by the above-described process is not clear, but it is surmised that since the thermoplastic elastomer first injected is soft, the thermoplastic synthetic resin material injected thereafter compresses the elastomer, thereby providing a denser molded product.

Although depending upon the kind of resin used, injection molding conditions may be selected roughly within the following ranges:

Nozzle temperature: 130° C. to 240° C.

Cylinder temperature: 130° C. to 220° C.

Die temperature: 140° C. to 230° C.

Mold temperature: 30° C. to 50° C.

Injection pressure: 400 kg/cm$^2$ to 1,000 kg/cm$^2$

The following is a description of resin materials used to produce the air bag cover.
Resin materials used:

The above-described thermoplastic synthetic resin material and thermoplastic elastomer must be compatible with each other. That is, these materials must be capable of welding together in the injection mold 10 without the need to use a primer or the like. Since the air bag cover 1 may be used in all possible environments, it must not undergo a marked change in the mechanical strength even in an extreme environment, for example, in the temperature range of from −45° C. to +105° C. In addition, a thermoplastic synthetic resin material used to form the mounting portion 5 must be sufficiently strong to prevent the mounting holes 6 from being damaged, for example, by tensile stress applied thereto when the air bag inflates.

In view of the above, nylon, polypropyrene, ABS, polycarbonate, etc. may suitably be used as a thermoplastic synthetic resin material from the viewpoint of strength and wear resistance. With regard to hardness, it is preferable to use a rigid thermoplastic synthetic resin material having a hardness not less than 60 (JIS, A-hardness), preferably 90 to 100.

As to the thermoplastic elastomer, it is preferable to use a material which is soft to the touch because the opening portion 3 comes into contact with the human skin., and which has a hardness of 50 to 95 (JIS, A-hardness), preferably 80 to 85. However, the thermoplastic elastomer must be resistant to softening or vitrification, that is, embrittlement, even in an extreme environment. In addition, the opening portion 3 must not burst into fragments when torn at the tear line 4.

From the above-described points of view, thermoplastic elastomers suitably used are urethane elastomers, olefin elastomers, diene elastomers, plasticized polyvinyl chloride, polyester elastomers, etc. It should be particularly noted that if a thermoplastic elastomer selected from among those proposed by the present inventor contains either a polyether block amide or a polyester thermoplastic elastomer, it can be bonded or welded to almost any kind of material.

In this case, it is preferable to use a material obtained by mechanically blending 25 to 185 parts by weight, more preferably 40 to 60 parts by weight, of a polyether block amide with 100 parts by weight of a thermoplastic elastomer so that the former is uniformly dispersed in the latter (see U.S. Pat. No. 5,002,625).

It is also preferable to use a material obtained by mechanically blending 25 to 185 parts by weight, more preferably 40 to 60 parts by weight, of a polyester thermoplastic elastomer with 100 parts by weight of a thermoplastic elastomer proposed by the present inventor so that the former is uniformly dispersed in the latter [see Japanese Patent Application Laid-Open (KOKAI) No. 3-100045 (U.S. patent application Ser. No. 578,337, now U.S. Pat. No. 5,149,589)].

Production method 2

In the above-described production method 1 the second cavity portion 46 is closed during the first step. In the production method 2, however, the second cavity portion 46, which is communicated with the first cavity portion 40, is also open during the first step in which the thermoplastic synthetic resin elastomer is injected through the gate A from the nozzle 29. That is, the molding process may be such that upon completion of the injection of the thermoplastic synthetic resin elastomer in the first step where the second cavity portion 46 is also open, the thermoplastic synthetic resin material is injected into the second cavity portion 46 from the nozzle 47 through the gate B in the second step. It should be noted that the mounting holes 6 of the air bag cover 1 are formed by pins 43 projected into the second cavity portion 46.

Production method 3

In addition, the molding process may also be such that the first and second steps are carried out simultaneously with both the first and second cavity portions 40 and 46 open. That is, it is possible to adopt a molding process in which the thermoplastic synthetic resin elastomer and the thermoplastic synthetic resin material are simultaneously injected into the first and second cavity portions 40 and 46 from the nozzles 29 and 47 through the gates A and B. This process enables the molding cycle to be shortened. It should be noted that the mounting holes 6 of the air bag cover 1 are formed by the pins 43 projected into the second cavity portion 46.

Second embodiment

Figure 6:
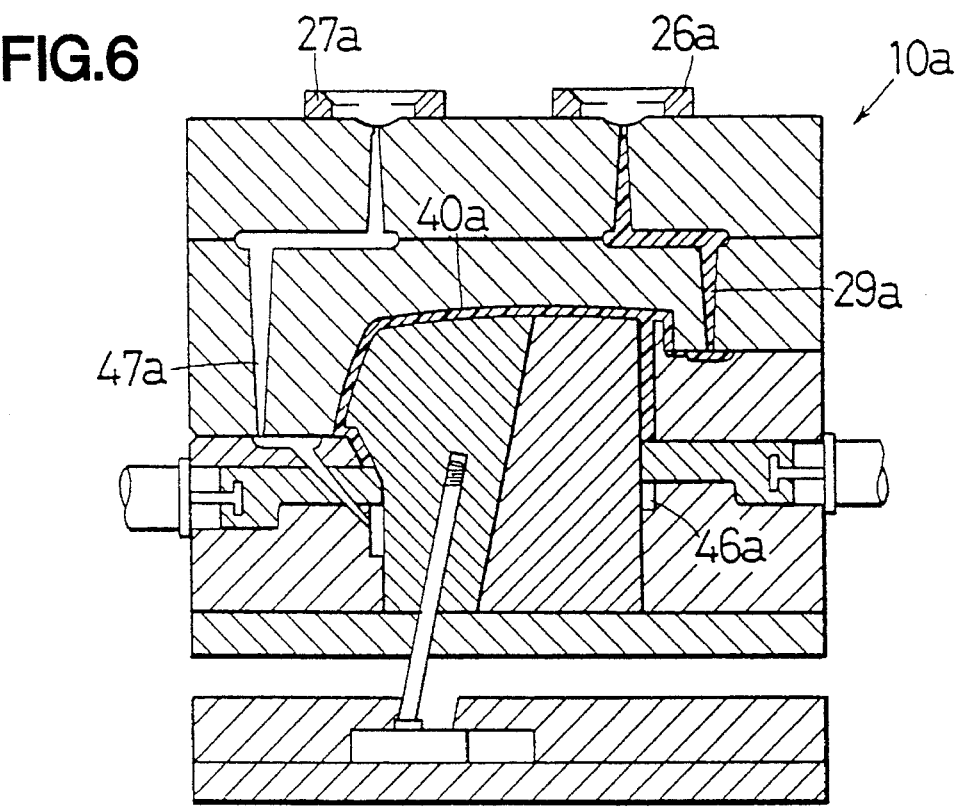
FIG. 6 is a sectional view of a second embodiment of the injection mold.
Figure 7:
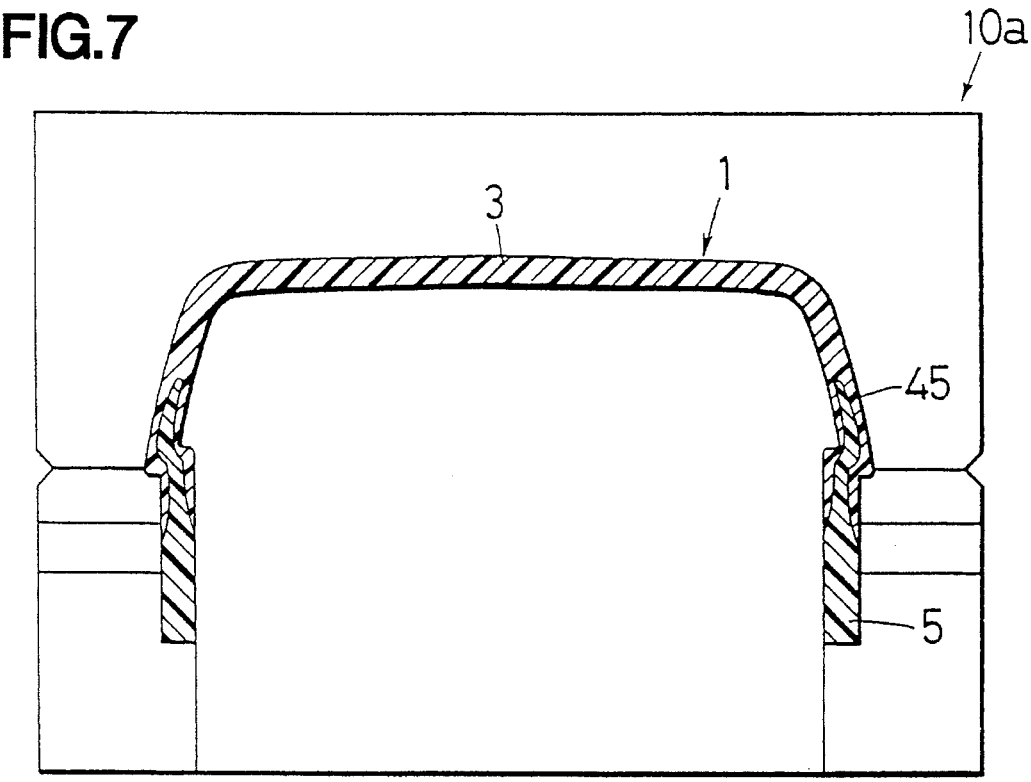
FIG. 7 is a sectional view of an air bag cover formed by the injection mold shown in FIG. 6.

FIGS. 6 and 7 show a second embodiment of the injection mold. FIG. 6 is a sectional view of an injection mold 10a in this embodiment, and FIG. 7 is a sectional view of an air bag cover 1 formed by the injection mold 10a. The structure and function of the injection mold 10a are basically the same as those in the first embodiment. This embodiment differs from the first embodiment only in that the air bag cover 1 is molded in the inverted position in relation to the cover 1 in the first embodiment.

A nozzle of an injection molding machine is brought into contact with a sprue bush 26a, and a molten thermoplastic synthetic resin elastomer is injected into a first cavity 40a through a nozzle 29a. Next, a molten rigid thermoplastic synthetic resin material is injected into a second cavity 46a through a nozzle 47a to form a mounting portion 5.

FIG. 7 is a sectional view of the molded air bag cover 1. The opening portion 3 and the mounting portion 5 deeply bite each other, so that these portions 3 and 5 are welded together through a wide joint area 45. The reason for this is not clear, but it is surmised that the relatively hard rigid thermoplastic synthetic resin material bites into the relatively soft thermoplastic synthetic resin elastomer, thereby providing the wide joint area 45. It is also surmised that the structure shown in FIG. 7 is obtained because the rigid thermoplastic synthetic resin material is injected only into the central portion of the thermoplastic synthetic resin elastomer, which has not yet cooled down and is therefore in a fluid state.

Other embodiments

It is a matter of course that various changes and modifications may be imparted to the above-described embodiments without departing from the spirit and scope of the present invention. For example, in the described embodiments synthetic resin materials of the same color are employed for the opening and mounting portions 3 and 5. However, since the mounting portion 5 is invisible from the outside, it may be made different in color from the opening portion 3 so that the position and bonding condition of the joint area 45 can be checked with the human eyes. By doing so, an even more convenient air bag cover is obtained.

Although in the foregoing embodiments the nozzles 29 and 47 are disposed at the bottom and top, respectively, of the main core 21, these nozzles may be disposed at other positions, for example, the corners of the main core 21. In addition, it is also possible to employ a known injection molding machine which is capable of injecting different resin materials from the same nozzle. Accordingly, the terms "first and second nozzles" used in the present invention do not necessarily mean two discrete nozzles nor two nozzles which are provided at the same position.

Further, the auxiliary core 31 in the injection mold 10 may be omitted, depending upon the configuration of the opening portion 3 of the air bag cover 1.

I claim:

1. An air bag assembly comprising an air bag cover enclosing an air bag, said air bag cover comprising:

an upper portion formed of a single layer of a thermoplastic synthetic resin elastomer wherein an upper surface of said upper portion has a tear line at which said upper portion is capable of being torn by a predetermined level of stress applied by inflation of said air bag;

a mounting portion made of a rigid thermoplastic synthetic resin material of a high mechanical strength having mounting holes at the base of said mounting portion for insertion of fasteners for attaching said cover to another member;

a joint area between said upper portion and said mounting portion, extending in a direction parallel to the surface of said mounting portion and perpendicular to said upper surface of said upper portion, wherein said rigid thermoplastic synthetic resin material is melted into said thermoplastic synthetic resin elastomer to form a joint comprising a fused mixture of said thermoplastic synthetic resin material and said thermoplastic synthetic resin elastomer, said joint area comprising a bonded recess of said upper portion and a bonded projection of said mounting portion formed by injecting said rigid thermoplastic synthetic resin material, in a fluid state, into a central portion of said thermoplastic resin elastomer during cooling of said thermoplastic synthetic resin elastomer, whereby, at a time of said injection, said central portion of said thermoplastic resin elastomer is melted, and an outer portion thereof has cooled and solidified.

* * * * *